(12) United States Patent  
Miura et al.

(10) Patent No.: US 12,055,773 B2  
(45) Date of Patent: Aug. 6, 2024

(54) ALIGNING OPTICAL CIRCUIT AND ALIGNING METHOD

(71) Applicant: Nippon Telegraph and Telephone Corporation, Tokyo (JP)

(72) Inventors: Toru Miura, Tokyo (JP); Yoshiho Maeda, Tokyo (JP); Hiroshi Fukuda, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 414 days.

(21) Appl. No.: 17/414,531

(22) PCT Filed: Dec. 3, 2019

(86) PCT No.: PCT/JP2019/047221  
§ 371 (c)(1),  
(2) Date: Jun. 16, 2021

(87) PCT Pub. No.: WO2020/129619  
PCT Pub. Date: Jun. 25, 2020

(65) Prior Publication Data  
US 2022/0057584 A1 Feb. 24, 2022

(30) Foreign Application Priority Data

Dec. 17, 2018 (JP) ................. 2018-235211

(51) Int. Cl.  
*G02B 6/42* (2006.01)  
*G02B 6/12* (2006.01)  
*G02B 6/26* (2006.01)

(52) U.S. Cl.  
CPC ............ *G02B 6/4231* (2013.01); *G02B 6/12* (2013.01); *G02B 6/26* (2013.01); *G02B 6/4249* (2013.01); *G02B 6/4292* (2013.01)

(58) Field of Classification Search  
CPC .......... G02B 6/4231; G02B 6/12; G02B 6/26; G02B 6/4249; G02B 6/4292  
USPC .......................................................... 385/52  
See application file for complete search history.

(56) References Cited

U.S. PATENT DOCUMENTS 8,737,845 B2    5/2014 Fiorentino et al.  
2015/0323753 A1*  11/2015 Furuya ............... G02B 6/4244  
                                                        385/14  
2017/0187462 A1*   6/2017 Luo .................... G02B 6/4246

FOREIGN PATENT DOCUMENTS

JP    2011520152 A    7/2011  
JP    2015212781 A    11/2015  
JP    2016148717 A    8/2016

OTHER PUBLICATIONS

Li et al. "CMOS-compatible high efficiency double-etched apodized waveguide grating coupler," Optics Express, vol. 21, No. 7, Apr. 8, 2013, pp. 7868-7874.

* cited by examiner

*Primary Examiner* — Jerry M Blevins  
(74) *Attorney, Agent, or Firm* — Slater Matsil, LLP

(57) ABSTRACT

An alignment optical circuit includes: a plurality of grating couplers that are formed on a substrate and arranged on a line; a plurality of optical waveguides that are connected to the plurality of grating couplers, respectively. Further, the alignment optical circuit includes an optical sensor that is formed on the substrate and measures optical intensity at a first light-receiving spot and a second light-receiving spot on a line along an arrangement direction of the plurality of grating couplers.

13 Claims, 16 Drawing Sheets ations No. PCT/JP2019/047221, filed on Dec. 3, 2019, which claims priority to Japanese Application No. 2018-235211, filed on Dec. 17, 2018, which applications are hereby incorporated herein by reference.

ALIGNING OPTICAL CIRCUIT AND ALIGNING METHOD

CROSS-REFERENCE TO RELATED APPLICATIONS

This application is a national phase entry of PCT Application No. PCT/JP2019/047221, filed on Dec. 3, 2019, which claims priority to Japanese Application No. 2018-235211, filed on Dec. 17, 2018, which applications are hereby incorporated herein by reference.

TECHNICAL FIELD

The present invention relates to an alignment optical circuit and an alignment method and, more specifically, to an alignment optical circuit and an alignment method used for the optical connection between a grating coupler and an optical fiber.

BACKGROUND

For optically connecting a silicon optical circuit and an optical fiber to each other (optical connection), a spot size convertor, a spherical tip fiber, or the like has been used to increase the efficiency of the optical connection between a waveguide end surface and the optical fiber. In recent years, many examples in which a silicon waveguide is provided with a grating including grooves having a width of several hundred nanometers, caused to function as a grating coupler that radiates light upward and downward from an optical waveguide onto a substrate surface, and optically connected to an optical fiber have been seen with the development of microfabrication technologies.

For example, there has been proposed a technology in which a grating coupler is used for optical connection with an optical fiber in silicon photonics (see NPL 1). According to the technology, the emission angle of light from the grating coupler to the upper surface of the light becomes an angle satisfying Formula (1) described in page 7870 of NPL 1 and is set to be an inclination angle within 20 degrees from a direction perpendicular to a substrate. The advantage of using the grating coupler is that the light can be input to and output from the surface of the substrate from above. For this reason, the technology of optical connection using a grating coupler is suitable for the examination of each optical circuit in a state in which a plurality of optical circuits are formed on a wafer, or the like.

When light is coupled to a grating coupler, a single mode fiber (SMF), a fiber array, or the like is used. For example, in an optical circuit, an input grating coupler is provided at the light input end of the optical circuit and an output grating coupler is provided at the light output end of the optical circuit to be used to examine the optical circuit. For example, light emitted from an input SMF is optically connected to the input grating coupler. On the other hand, light emitted from the output grating coupler is optically connected to an output SMF to be extracted and used to examine the optical circuit.

In this case, the alignment between the input SMF and the input grating coupler and the alignment between the output SMF and the output grating coupler are required. In order to perform the alignment in a single alignment device, it is presumed as shown in FIG. 13 that a fiber array 304 in which a plurality of SMFs are bundled together is used, and that a plurality of grating couplers 301 connected to an optical waveguide 302 of an optical circuit 300 that is an object to be examined are arranged at the arrangement pitch of the SMFs of the fiber array 304.

For example, when a SMF at one end of the fiber array 304 and a corresponding grating coupler 301 are used for input and a SMF at the other end of the fiber array 304 and a corresponding grating coupler 301 are used for output, alignment for both the input and the output can be performed in a single optical alignment system (device). Further, it is also possible to measure the state of optical coupling in the plurality of grating couplers of the optical circuit 300 using the respective grating couplers 301 with the configuration described above.

CITATION LIST

Non Patent Literature

NPL 1 C. Li et al., "CMOS-compatible high efficiency double-etched apodized waveguide grating coupler", Optics Express, vol. 21, no. 7, pp. 7868-7874, 2013.

SUMMARY

Technical Problem

However, when the fiber array 304 is used as described above, the alignment between the plurality of SMFs and the plurality of grating couplers 301 is performed at the same time. When the fiber array 304 is used, it is difficult to optically connect the plurality of grating couplers 301 and the plurality of SMFs to each other at the same time and in an optimum state if the fiber array 304 is rotated (deviated) about a Z-axis that is the normal line direction of the plane of the optical circuit 300 and about an X-axis that is a direction perpendicular to the arrangement direction of the plurality of SMFs of the fiber array as shown in FIG. 14.

Embodiments of the present invention have been made in order to solve the above problem and has an object of making it possible to easily perform alignment for obtaining the optical connection between a plurality of optical fibers of a fiber array in which the plurality of optical fibers are bundled together and corresponding grating couplers.

Means for Solving the Problem

An alignment optical circuit according to embodiments of the present invention includes: a plurality of grating couplers that are formed on a substrate and arranged on a line; a plurality of optical waveguides that are connected to the plurality of grating couplers, respectively; and an optical sensor that is formed on the substrate and measures optical intensity at two light-receiving spots on a line along an arrangement direction of the plurality of grating couplers. An interval between the two light-receiving spots is an interval between any two of the plurality of grating couplers.

In a configuration example of the alignment optical circuit, the optical sensor includes a light-receiving region that involves the two light-receiving spots and extends along the arrangement direction.

In a configuration example of the alignment optical circuit, the optical sensor is formed at each of the two light-receiving spots.

In a configuration example of the alignment optical circuit, the interval between the two light-receiving spots is an interval between both ends of the plurality of grating couplers.

An alignment optical circuit according to embodiments of the present invention includes: a plurality of grating couplers that are formed on a substrate and arranged on a line; a plurality of optical waveguides that are connected to the plurality of grating couplers, respectively; and a plurality of optical sensors that are formed on the substrate and arranged along an arrangement direction of the plurality of grating couplers.

An alignment method according to embodiments of the present invention is an alignment method for aligning an alignment optical circuit including a plurality of grating couplers that are formed on a substrate and arranged on a line, a plurality of optical waveguides that are connected to the plurality of grating couplers, respectively, and an optical sensor that is formed on the substrate and measures optical intensity at two light-receiving spots on a line along an arrangement direction of the plurality of grating couplers, and a first grating coupler and a second grating coupler that are any two of the plurality of grating couplers and a first optical fiber and a second optical fiber that are any two of optical fibers of a fiber array in which the plurality of optical fibers are arranged in a line, the alignment method including: a first step of arranging the fiber array with a light-emitting direction of each of the plurality of optical fibers directed to a side of the alignment optical circuit; a second step of causing the fiber array to move in a direction perpendicular to the arrangement direction of the grating couplers and pass over the optical sensor within a plane parallel to a plane of the alignment optical circuit in a state in which light is emitted from the first optical fiber and the second optical fiber to the side of the alignment optical circuit and measuring an intensity change of each of first light emitted from the first optical fiber and second light emitted from the second optical fiber at the two light-receiving spots; a third step of finding an angle formed by the arrangement direction of the plurality of grating couplers and an arrangement direction of the plurality of optical fibers within the plane parallel to the plane of the alignment optical circuit from a difference between the intensity change of the first light and the intensity change of the second light that are measured by the optical sensor; and a fourth step of rotating the arrangement direction of the plurality of optical fibers by the angle found in the third step within the plane parallel to the plane of the alignment optical circuit to perform alignment.

An alignment method according to embodiments of the present invention is an alignment method for aligning an alignment optical circuit including a plurality of grating couplers that are formed on a substrate and arranged on a line, a plurality of optical waveguides that are connected to the plurality of grating couplers, respectively, and a plurality of optical sensors that are arranged along an arrangement direction of the plurality of grating couplers, and a first grating coupler and a second grating coupler that are any two of the plurality of grating couplers and a first optical fiber and a second optical fiber that are any two of optical fibers of a fiber array in which the plurality of optical fibers are arranged in a line, the alignment method including: a first step of arranging the fiber array in a state in which light emitted from each of the plurality of optical fibers is received by any of the plurality of optical sensors; a second step of causing the fiber array to move in a direction distant from a plane of the alignment optical circuit in a state in which the light is emitted from the first optical fiber and the second optical fiber to a side of the alignment optical circuit and measuring an intensity change of each of first light emitted from the first optical fiber and second light emitted from the second optical fiber by the plurality of optical sensors; a third step of finding an angle formed by a plane of the substrate and an arrangement direction of the plurality of optical fibers about an axis perpendicular to the arrangement direction of the plurality of grating couplers from a difference between the intensity change of the first light and the intensity change of the second light that are measured by the plurality of optical sensors; and a fourth step of rotating the arrangement direction of the plurality of optical fibers by the angle found in the third step about the axis to perform alignment.

Effects of Embodiments of the Invention

As described above, since a plurality of light-receiving spots are provided on a substrate on which a plurality of grating couplers are formed according to embodiments of the present invention, it is possible to easily perform alignment for obtaining the optical connection between a plurality of optical fibers of a fiber array in which the plurality of optical fibers are bundled together and corresponding grating couplers.

DETAILED DESCRIPTION OF ILLUSTRATIVE EMBODIMENTS

Hereinafter, alignment optical circuits and alignment methods according to embodiments of the present invention will be described.

First Embodiment

Figure 1A:
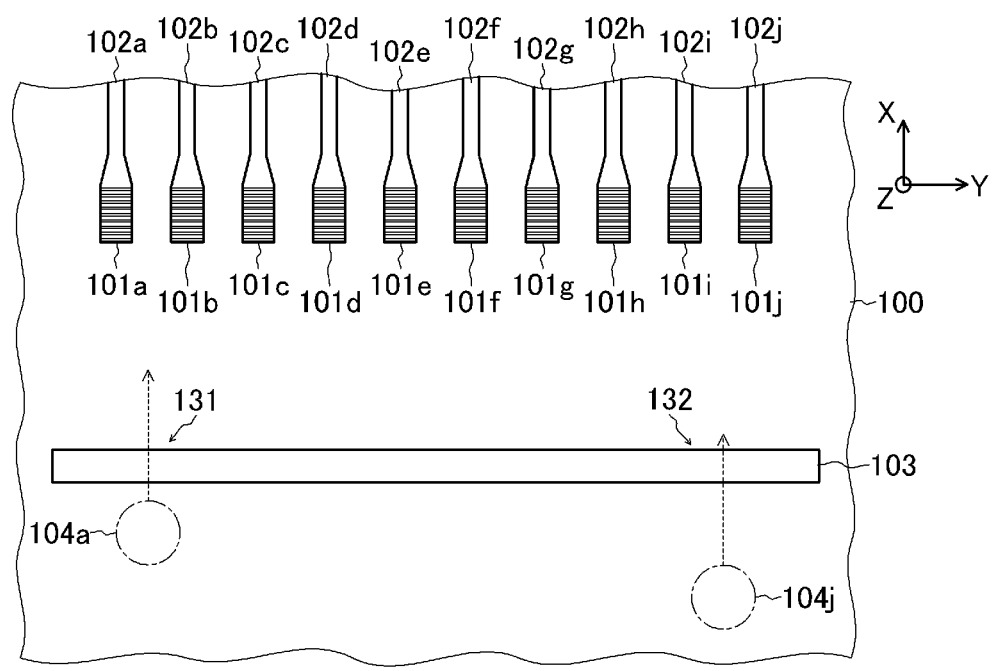
FIG. 1A is a plan view showing the configuration of an alignment optical circuit according to a first embodiment of the present invention.

To begin with, an alignment optical circuit according to a first embodiment of the present invention will be described with reference to FIG. 1A. First, the alignment optical circuit includes a plurality of grating couplers 101a, 101b, 101c, 101d, 101e, 101f, 101g, 101h, 101i, and 101j that are formed on a substrate 100 and arranged on a line and a plurality of optical waveguides 102a, 102b, 102c, 102d, 102e, 102f, 102g, 102i, 102h, and 102j that are connected to the plurality of grating couplers 101a to 101j, respectively. The plurality of grating couplers 101a to 101j are arranged at even intervals on the same line (a line parallel to a Y-axis). Further, the optical waveguides 102a to 102j are optically connected to an optical circuit that is formed on the substrate 100 and not shown. Note that a direction in which the plurality of grating couplers 101a to 101j are arranged is a Y-axis direction.

Further, the alignment optical circuit includes an optical sensor 103 that is formed on the substrate 100 and measures optical intensity at a first light-receiving spot 131 and a second light-receiving spot 132 on a line along the arrangement direction (Y-axis direction) of the plurality of grating couplers 101a to 101j. In the first embodiment, the optical sensor 103 includes a light-receiving region that involves the first light-receiving spot 131 and the second light-receiving spot 132 and extends along the arrangement direction (Y-axis direction) of the plurality of grating couplers 101a to 101j.

The alignment optical circuit performs alignment in relation to a rotational deviation about a Z-axis between the arrangement direction of a plurality of optical fibers constituting a fiber array that is an object to be aligned and the arrangement direction (Y-axis direction) of the plurality of grating couplers 101a to 101j. That is, a rotational deviation angle about the Z-axis between the arrangement direction of the plurality of optical fibers constituting the fiber array that is an object to be aligned and the arrangement direction (Y-axis direction) of the plurality of grating couplers 101a to 101j is found by the alignment optical circuit. Note that the Z-axis is an axis perpendicular to the plane of the substrate 100.

The interval between the first light-receiving spot 131 and the second light-receiving spot 132 at which the optical sensor 103 performs optical intensity measurement is the interval between any two of the plurality of grating couplers 101a to 101j. The interval between the first light-receiving spot 131 and the second light-receiving spot 132 is, for example, the interval between both ends of the plurality of grating couplers 101a to 101j. Note that an object to be aligned using the alignment optical circuit is the fiber array in which the plurality of optical fibers are arranged in a line. The fiber array is, for example, a fiber array in which ten optical fibers are arranged in a line.

The optical sensor 103 can be constituted by, for example, a well-known surface incident photo diode (PD). As such, a GePD including a light absorption layer made of germanium, a SiPD including a light absorption layer made of silicon, or the like can be used. The optical sensor 103 is required to have, as a length in the Y-axis direction of the light-receiving region, a length at which light emitted from each of a first optical fiber 104a and a second optical fiber 104j that serve as objects to be aligned in the fiber array can be received. For example, when the fiber array is constituted by ten optical fibers and the interval between the adjacent optical fibers is 127 μm, the interval between the first optical fiber 104a and the second optical fiber 104j at both ends of the fiber array is 1143 μm. In this case, the length in the Y-axis direction of the light-receiving region of the optical sensor 103 is set to be longer than 1143 μm.

Figure 1B:
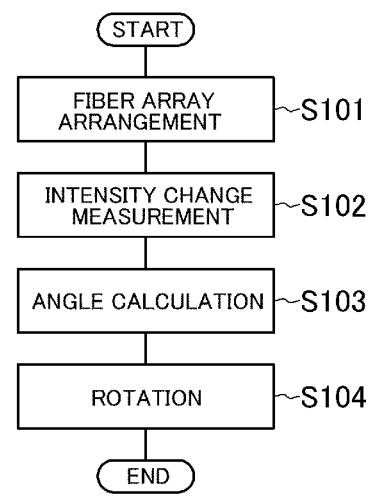
FIG. 1B is a flowchart for describing an alignment method according to the first embodiment of the present invention.

Next, an alignment method according to the first embodiment will be described using the flowchart of FIG. 1B. First, in a first step S101, the fiber array is arranged with the light-emitting direction of each of the plurality of optical fibers of the fiber array directed to the side of the alignment optical circuit. Note that the fiber array is rotated by a prescribed angle about the Y-axis that is a direction in which the plurality of optical fibers are arranged. The angle is the incident and emitting angle of light determined by the structure of the grating couplers, and set to be, for example, an inclination angle within 20 degrees from a direction perpendicular to the substrate plane of the alignment optical circuit in NPL 1.

Next, in a second step S102, in a state in which light is emitted from the first optical fiber 104a and the second optical fiber 104j to the side of the alignment optical circuit, the fiber array is caused to move in a direction (X-axis direction) perpendicular to the arrangement direction of the grating couplers 101a to 101j and pass over (move on) the optical sensor 103 within a plane parallel to the plane of the alignment optical circuit.

For example, with the alignment optical circuit (or the fiber array) fixed onto an electric stage having a stepping motor or the like, the electric stage is caused to move. That is, the passage of the fiber array described above can be performed in such a manner that the alignment optical circuit is caused to relatively move with respect to the fiber array. Thus, the intensity change of each of first light emitted from the first optical fiber 104a and second light emitted from the second optical fiber 104j is measured at each of the first light-receiving spot 131 and the second light-receiving spot 132 of the optical sensor 103 (intensity change measurement). For example, each of photocurrents flowing through the first light-receiving spot 131 and the second light-receiving spot 132 of the optical sensor 103 is measured at the same time. When a deviation amount in the θz direction of the fiber array is small, the two light is incident on the PD at the same time. Therefore, there is a possibility that the photocurrents generated by the two light cannot be separated from each other. In this case, the two light is not measured at the same time, but the measurement is performed with light emitted from one fiber and then performed with light emitted from the other fiber. In this manner, the photocurrents can be separated and measured.

Next, in a third step S103, an angle θ formed by the arrangement direction (Y-axis direction) of the plurality of grating couplers 101a to 101j and the arrangement direction of the plurality of optical fibers in the fiber array within the plane parallel to the substrate plane of the alignment optical circuit is found from the difference between the intensity change of the first light and the intensity change of the second light that are measured by the optical sensor 103 (angle calculation).

Figure 2:
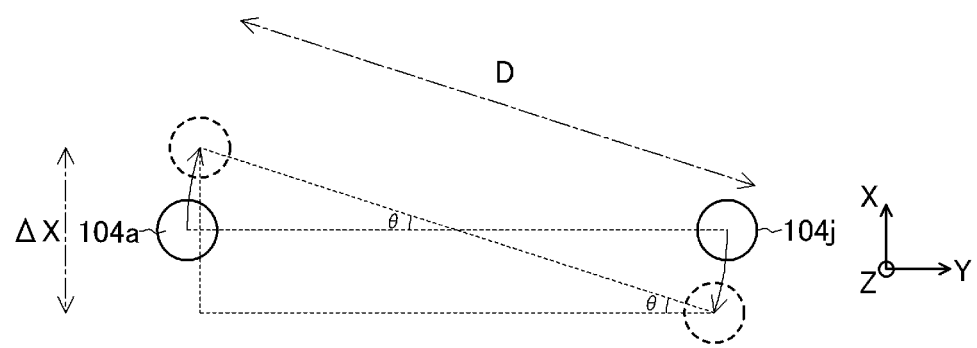
FIG. 2 is a diagram for describing a state in which the arrangement direction of a plurality of optical fibers constituting a fiber array is rotated by an angle θ about a Z-axis with respect to a Y-axis.

For example, in a state in which the arrangement direction of the plurality of optical fibers constituting the fiber array is rotated by the angle θ about a Z-axis with respect to the direction (Y-axis) in which the plurality of grating couplers 101a to 101j are arranged as shown in FIG. 2, it is difficult to align each of all the optical fibers and the grating couplers 101a to 101j at the same time. For example, even if alignment is performed so that the optical connection between an optical fiber near the center of the fiber array and a corresponding grating coupler becomes optimum, the optical connection between optical fibers distant from the center of the fiber array and corresponding grating couplers causes large coupling loss. In a state in which the large coupling loss is caused, the port dependency of the insertion loss of an optical signal with respect to the optical circuit is also caused.

For example, in a case in which the fiber array is constituted by ten optical fibers, the positional relationship between the first optical fiber 104a and the second optical fiber 104j at both ends of the fiber array when the fiber array is rotated by θ degrees about the Z-axis with its center as a rotational center creates a state shown in FIG. 2. When the interval between the adjacent optical fibers of the fiber array is 127 μm, a distance D between the first optical fiber 104a and the second optical fiber 104j becomes 1143 μm.

Figure 3:
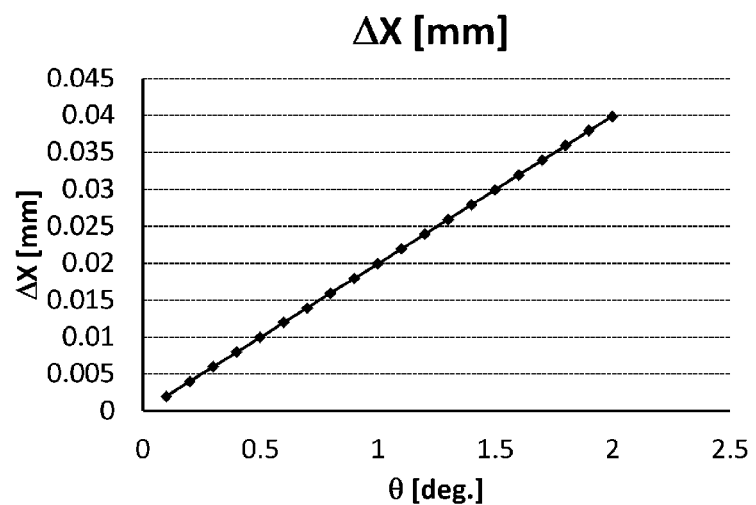
FIG. 3 is a characteristic diagram showing the relationship between a positional deviation amount Δx in an X-axis direction between a first optical fiber 104a and a second optical fiber 104j and the rotational angle θ between a state in which the fiber array is not rotated about the Z-axis and a state in which the fiber array is rotated by θ degrees about the Z-axis.

In this case, the relationship between a positional deviation amount Δx in the X-axis direction between the first optical fiber 104a and the second optical fiber 104j and the rotational angle θ between a state in which the fiber array is not rotated about the Z-axis and a state in which the fiber array is rotated by θ degrees about the Z-axis is shown in FIG. 3. When θ is zero, the positional deviation amount Δx in the X-axis direction between the first optical fiber 104a and the second optical fiber 104j becomes zero. On the other hand, for example, when θ becomes only 0.5 degrees, it is found that ΔX becomes about 10 μm, and that the positional deviation of each of the first optical fiber 104a and the second optical fiber 104j from a corresponding grating coupler becomes 5 μm. When consideration is given to the fact that the optical fibers have a core diameter of about 10 μm, the numerical value described above results in a crucial positional deviation.

Figure 4:
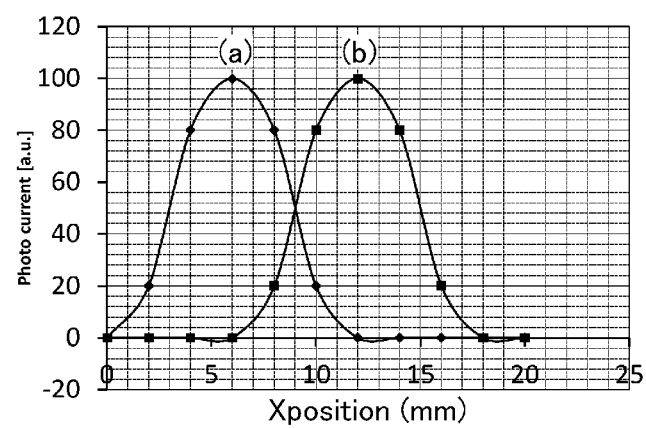
FIG. 4 is a characteristic diagram showing an intensity change (a) measured at a first light-receiving spot 131 and an intensity change (b) measured at a second light-receiving spot 132 when the fiber array is moved.

The positional deviation by rotation about the Z-axis of the fiber array is found in the first step S101 to the third step S103 described above. In the intensity change measurement of the second step S102, intensity changes (a) and (b) are measured at the first light-receiving spot 131 and the second light-receiving spot 132, respectively, as shown in FIG. 4 when the fiber array is moved. From the difference between the intensity changes (a) and (b), the angle θ is found. For example, the deviation between the peak position of the intensity change (a) and the peak position of the intensity change (b) corresponds to ΔX. In an example shown in FIG. 4, ΔX is equal to 6 μm. When ΔX is equal to 6 μm, it is found from the relationship between ΔX and θ described above using FIGS. 2 and 3 that θ is equal to 0.3 degrees.

After the angle θ formed by the arrangement direction (Y-axis direction) of the plurality of grating couplers 101a to 101j and the arrangement direction of the plurality of optical fibers of the fiber array is found as described above, the arrangement direction of the plurality of optical fibers of the fiber array is rotated by the angle found in the third step within the plane parallel to the substrate plane of the alignment optical circuit to perform alignment in a fourth step S104 (rotation). Further, the fiber array that has been subjected to the alignment by the adjustment of the angle about the Z-axis is caused to move parallel on the plane of the substrate 100 in a state in which the adjusted angle is maintained, and arranged at the position of optical connection with the plurality of grating couplers 101a to 101j.

Figure 5:
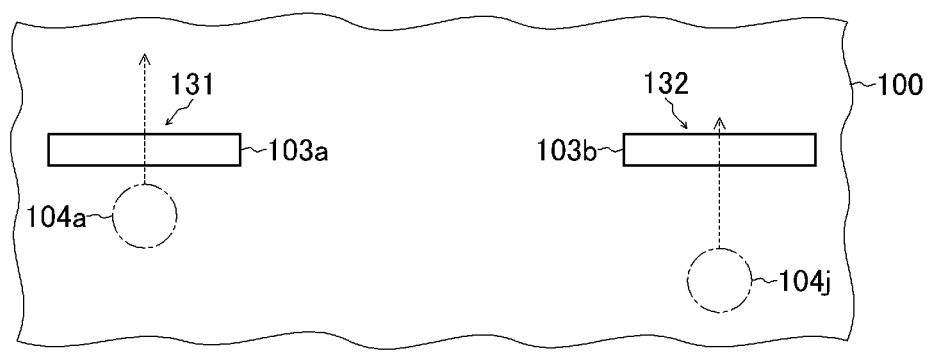
FIG. 5 is a plan view showing a part of the configuration of another alignment optical circuit according to the first embodiment of the present invention.

Meanwhile, the one optical sensor 103 including the light-receiving region that involves the first light-receiving spot 131 and the second light-receiving spot 132 and extends in the Y-axis direction is used in the above description. However, a first optical sensor 103a and a second optical sensor 103b that are formed on the substrate 100 may be used as shown in FIG. 5. The first optical sensor 103a and the second optical sensor 103b are formed at the first light-receiving spot 131 and the second light-receiving spot 132, respectively. The optical sensor 103 is (the first optical sensor 103a and the second optical sensor 103b are) only required to be arranged at any place on the substrate 100.

Further, in the above description, the angle formed by the arrangement direction (Y-axis direction) of the plurality of grating couplers and the arrangement direction of the plurality of optical fibers within the plane parallel to the plane of the alignment optical circuit is found from the difference between the peak positions as the difference of the intensity change between the first light emitted from the first optical fiber and the second light emitted from the second optical fiber. However, the angle may be found in a different way. For example, as the difference of the intensity change between the first light emitted from the first optical fiber and the second light emitted from the second optical fiber, the angle formed by the arrangement direction (Y-axis direction) of the plurality of grating couplers and the arrangement direction of the plurality of optical fibers within the plane parallel to the plane of the alignment optical circuit can be found from the difference (deviation amount) between positions at which the intensity of the first light and the intensity of the second light become the same.

For example, there is a case that the peak position of one intensity change does not appear in a range in which the fiber array is caused to move in the X-axis direction since the width (the length in the X-axis direction) of the optical sensor 103 is large. In such a case, the above angle is found from the difference between the spots of slopes that change in the same state (positions at which the intensity becomes the same).

Note that in order to use the peak positions as the difference of the intensity change between the first light emitted from the first optical fiber and the second light emitted from the second optical fiber, the width of the optical sensor 103 desirably falls within a prescribed size considering an angle that is required to be detected and the spot size of the light emitted from the optical fibers as will be described below.

For example, when the fiber array is constituted by ten optical fibers, the interval between the adjacent optical fibers is 127 μm, and the spot size of light is 20 μm, the width of the optical sensor 103 is desirably 30 μm or less to detect the deviation of an angle θ of 0.5 degrees. Note that the limitation value of the minimum width of the optical sensor 103 is determined under the manufacturing constraints of the optical sensor 103.

As described above, an optical sensor that measures light intensity at two spots on a line extending along an arrangement direction is provided on a substrate on which a plurality of grating couplers are formed according to the first embodiment. Therefore, alignment for obtaining the optical connection between a plurality of optical fibers of a fiber array in which the plurality of optical fibers are bundled together and corresponding grating couplers can be easily performed.

Second Embodiment

Figure 6A:
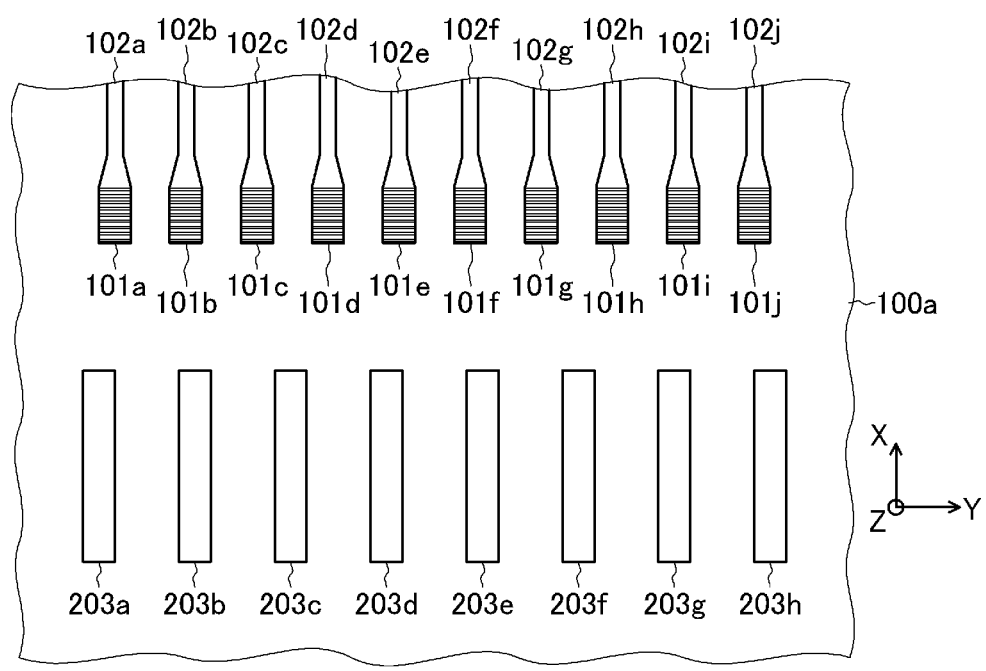
FIG. 6A is a plan view showing the configuration of an alignment optical circuit according to a second embodiment of the present invention.

Next, an alignment optical circuit according to a second embodiment of the present invention will be described with reference to FIG. 6A. The alignment optical circuit includes a plurality of grating couplers 101a to 101j that are formed on a substrate 100a and arranged on a line and a plurality of optical waveguides 102a to 102j that are connected to the plurality of grating couplers 101a to 101j, respectively. These elements are the same as those of the first embodiment described above.

Further, the alignment optical circuit includes a plurality of optical sensors 203a, 203b, 203c, 203d, 203e, 203f, 203g, and 203h that are formed on the substrate 100a and arranged along the arrangement direction (Y-axis direction) of the plurality of grating couplers 101a to 101j. Each of the optical sensors 203a to 203h includes a light-receiving region that extends in a direction (X-axis direction) orthogonal to the arrangement direction of the plurality of grating couplers 101a to 101j. The arrangement spot of each of the optical sensors 203a to 203h serves as a light-receiving spot. The alignment optical circuit performs alignment in relation to a rotational deviation about an X-axis in the arrangement direction of a plurality of optical fibers constituting a fiber array that is an object to be aligned. That is, a rotational deviation angle about the X-axis between the arrangement direction of the plurality of optical fibers constituting the fiber array that is an object to be aligned and the plane of the substrate 100a is found by the alignment optical circuit.

An object to be aligned using the alignment optical circuit of the second embodiment is the fiber array in which the plurality of optical fibers are arranged in a line. The fiber array is, for example, a fiber array in which ten optical fibers are arranged in a line.

Each of the optical sensors 203a to 203h can be constituted by, for example, a well-known surface incident PD. As such, a GePD including a light absorption layer made of germanium, a SiPD including a light absorption layer made of silicon, or the like can be used.

Each of the optical sensors 203a to 203h is required to have, as a length in the X-axis direction of the light-receiving region, a length at which light emitted from each of a first optical fiber 104a and a second optical fiber 104j that serve as objects to be aligned in the fiber array can be received.

The fiber array that is an object to be aligned is arranged to be rotated about a Y-axis by a prescribed angle determined by grating design from a direction perpendicular to the substrate plane of the alignment optical circuit as described above in optical connection with the plurality of grating couplers 101a to 101j. The angle described above is set to be, for example, within 20 degrees in NPL 1. When the rotation angle about the Y-axis is θY, the length in the X-axis direction of the light-receiving region described above is required to have a length considering θY and the shift amounts in the X-axis direction of the optical axes of the optical fibers and the spot size of light that are determined from the relationship of the rising amount of the fiber array that will be described later. The point will be described later.

Figure 6B:
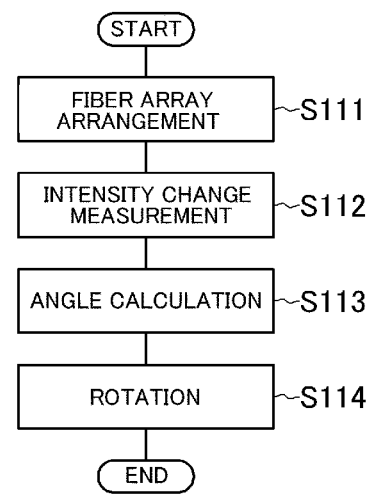
FIG. 6B is a flowchart for describing an alignment method according to the second embodiment of the present invention.

Next, an alignment method according to the second embodiment will be described using the flowchart of FIG. 6B. First, in a first step S111, the fiber array is arranged with the light-emitting direction of each of the plurality of optical fibers of the fiber array directed to the side of the alignment optical circuit. Note that in the same manner as the above, the fiber array is rotated by a prescribed angle about the Y-axis that is a direction in which the plurality of optical fibers are arranged.

Next, in a second step S112, in a state in which light is emitted from the first optical fiber 104a and the second optical fiber 104j to the side of the alignment optical circuit, the fiber array is caused to move in a direction distant from the plane of the alignment optical circuit. For example, with the alignment optical circuit (or the fiber array) fixed onto an electric stage having a stepping motor or the like, the electric stage is caused to move (vertically move). That is, the movement of the fiber array described above can performed in such a manner that the alignment optical circuit is caused to relatively move with respect to the fiber array.

Each of first light emitted from the first optical fiber 104a and second light emitted from the second optical fiber 104j is caused to pass over the plurality of optical sensors 203a to 203h by the movement, and the intensity change of each of the first light and the second light is measured by the plurality of optical sensors 203a to 203h.

Next, in a third step S113, an angle θ2 formed by the plane of the substrate 100 and the arrangement direction of the plurality of optical fibers of the fiber array about the axis (X-axis) perpendicular to the arrangement direction (Y-axis) of the plurality of grating couplers 101a to 101j is found from the difference between the intensity change of the first light and the intensity change of the second light that are measured by the plurality of optical sensors 203a to 203h (angle calculation).

Figure 7:
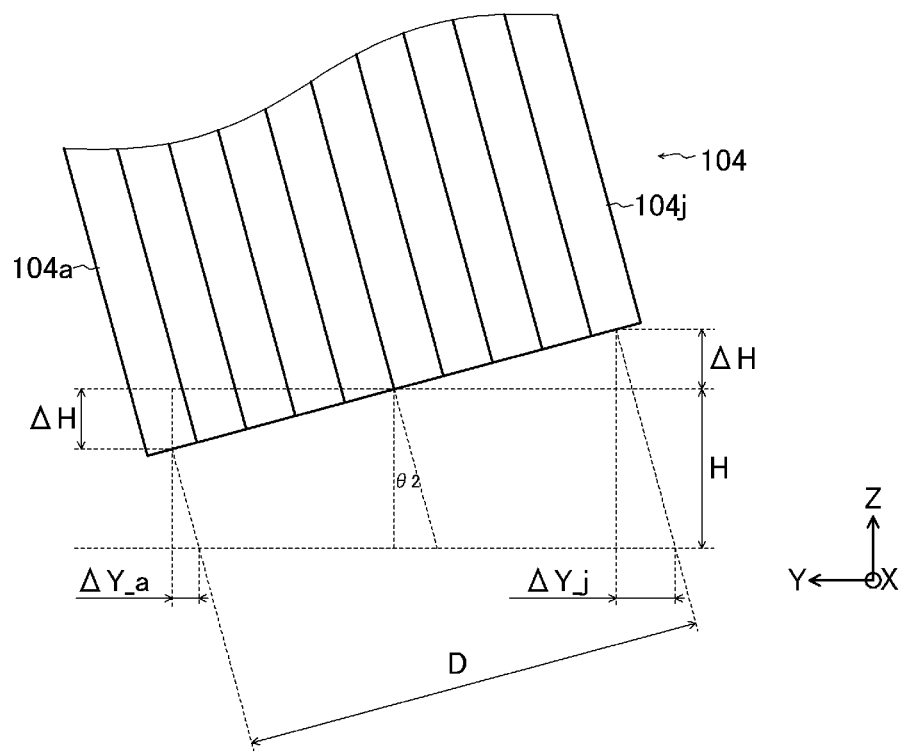
FIG. 7 is a diagram for describing a state in which the arrangement direction of a plurality of optical fibers constituting a fiber array is rotated by an angle θ2 about an X-axis with respect to a Y-axis.

For example, in a state in which the arrangement direction of a plurality of optical fibers constituting a fiber array 104 is rotated by the angle θ2 about the X-axis with respect to the substrate plane as shown in FIG. 7, it is difficult to align each of all the optical fibers and the grating couplers 101a to 101j at the same time.

Here, a case in which the arrangement direction of the plurality of optical fibers of the fiber array 104 is not parallel to the substrate plane but is rotated about the X-axis is compared with a case in which the arrangement direction is not rotated but both the arrangement direction and the substrate plane are parallel to each other (θ2=0 degree). First, an irradiation position on the substrate of the light emitted from the first optical fiber 104a is deviated by ΔY_a between the case in which the arrangement direction is rotated and the case in which the arrangement direction is not rotated. Further, an irradiation position on the substrate of the light emitted from the second optical fiber 104j is deviated by ΔY_j between the case in which the arrangement direction is rotated and the case in which the arrangement direction is not rotated. Note that these deviation amounts are produced when the fiber array 104 and the substrate plane of the alignment optical circuit are separated from each other by a distance H.

Figure 8:
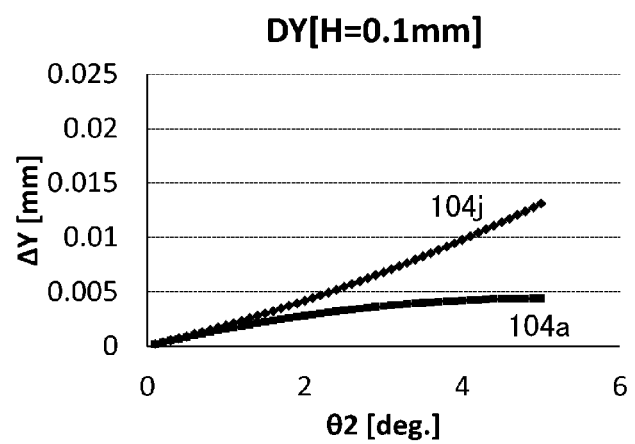
FIG. 8 is a characteristic diagram showing the changes of deviation amounts ΔY_a and ΔY_j as θ2 changes when a distance H is 100 μm.

When the distance H described above is 100 μm, the deviation amounts ΔY_a and ΔY_j described above change as shown in FIG. 8 as θ2 changes. Note that the results of FIG. 8 are obtained from calculation. The deviation amounts ΔY_a and ΔY_j increase as θ2 increases. Further, the difference between the deviation amounts ΔY_a and ΔY_j increases as θ2 increases.

Figure 9:
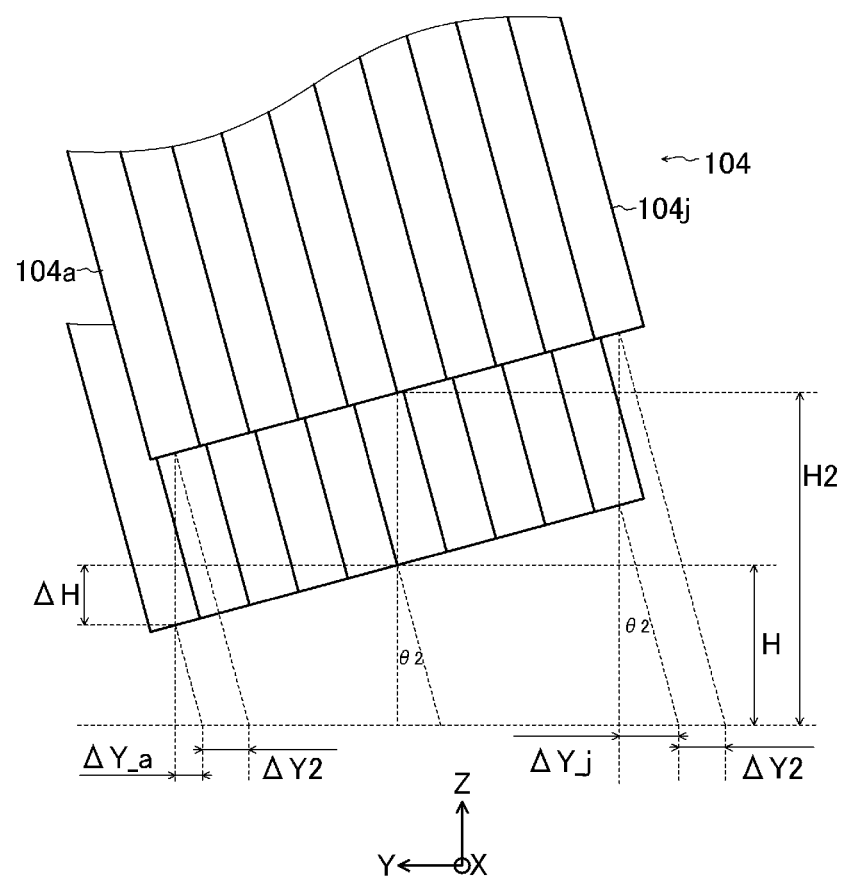
FIG. 9 is a diagram for describing a state in which the arrangement direction of the plurality of optical fibers constituting the fiber array is rotated by the angle θ2 about the X-axis with respect to the Y-axis.

Even if θ2 is constant, the deviation amounts ΔY_a and ΔY_j described above also change as the distance between the fiber array 104 and the substrate plane of the alignment optical circuit changes. When the distance H between the fiber array 104 and the substrate plane of the alignment optical circuit is changed to a distance H2 as shown in FIG. 9, the deviation amount of the irradiation position on the substrate of the light emitted from the first optical fiber 104a increments by ΔY2 from ΔY_a. Further, when the distance H between the fiber array 104 and the substrate plane of the alignment optical circuit is changed to the distance H2, the deviation amount of the irradiation position on the substrate of the light emitted from the second optical fiber 104j increments by ΔY2 from ΔY_j. The changes of both the deviation amounts caused when the distance H is changed to the distance H2 are ΔY2.

Figure 10:
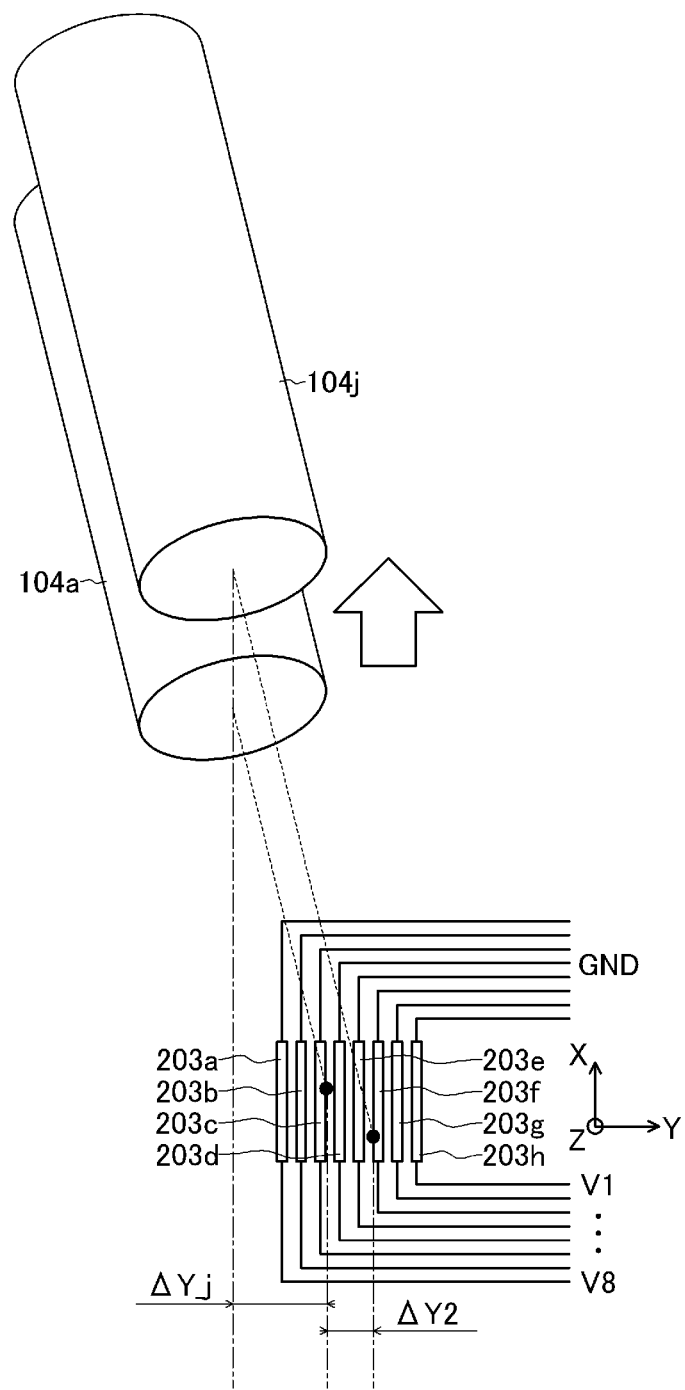
FIG. 10 is a diagram for describing the measurement of ΔY2 using a plurality of optical sensors 203a to 203h.

ΔY2 caused when the fiber array 104 is caused to move in a direction distant from the plane of the alignment optical circuit is found in the first step S111 to the third step S113 described above. As shown in FIG. 10, ΔY2 is measured using the plurality of optical sensors 203a to 203h of which the planar shape in each light-receiving region is a stripe shape extending in the X-axis direction.

The plurality of optical sensors 203a to 203h has, as the length in the X-axis direction of each light-receiving region, a length considering θY and the shift amounts in the X-axis direction of the optical axes of the optical fibers and the spot size of light that are determined from the relationship of the rising amount (H2-H) of the fiber array. Further, the arrangement interval between the plurality of optical sensors 203a to 203h can be determined by θ2 that is required to be found and a rising amount from the distance H to the distance H2. Further, the length in the Y-axis direction of each of the light-receiving regions of the plurality of optical sensors 203a to 203h is required to be the arrangement interval described above or less.

Light intensity profiles obtained by measuring the light intensity of the light from the first optical fiber 104a and the light from the second optical fiber 104j, which are irradiated onto the optical sensors 203a to 203h in which the respective conditions are set as described above, at each of the optical sensors 203a to 203h are compared with each other between a case before the fiber array is caused to move and a case after the fiber array is caused to move to calculate ΔY2.

Figure 11:
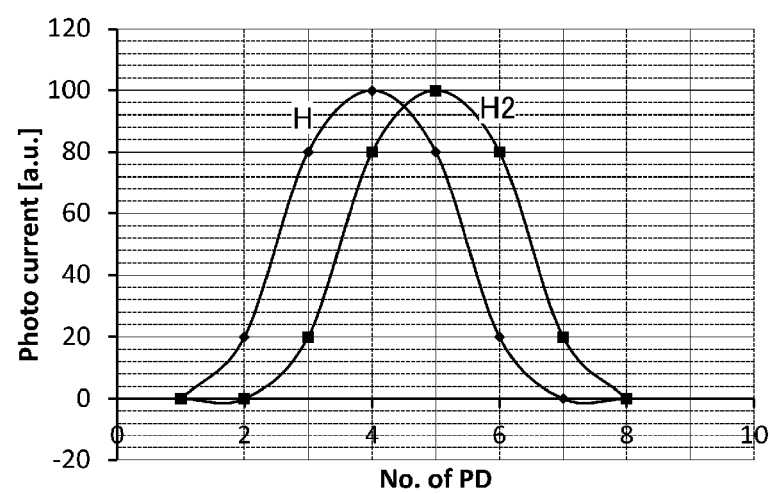
FIG. 11 is a characteristic diagram showing a light intensity profile H at a distance H and a light intensity profile H2 at a distance H2.
Figure 12:
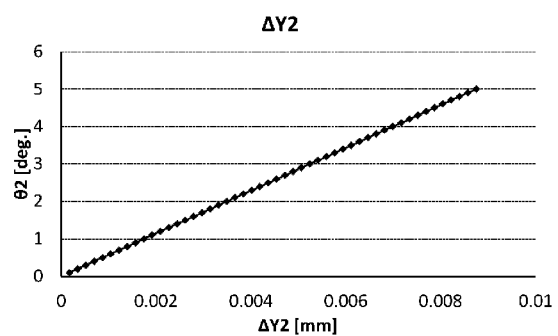
FIG. 12 is a characteristic diagram showing the relationship between θ2 and ΔY2 when H2-H is equal to 100 μm.
Figure 13:
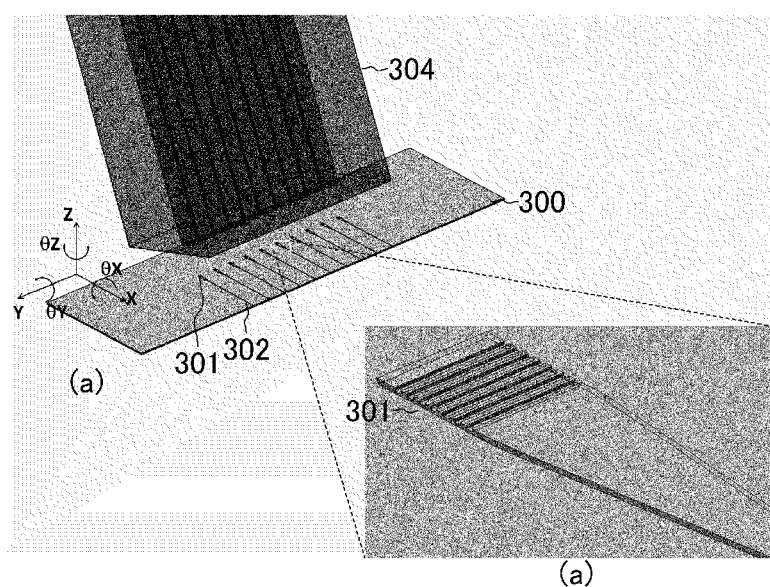
FIG. 13 is a perspective view for describing the state of the alignment between a fiber array 304 in which a plurality of SMFs are bundled together and a plurality of grating couplers 301.
Figure 14:
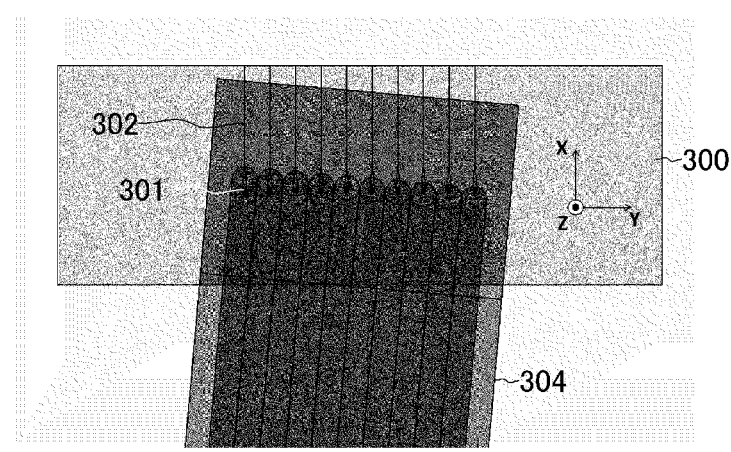
FIG. 14 is a perspective view for describing the state of the alignment between the fiber array 304 in which the plurality of SMFs are bundled together and the plurality of grating couplers 301.

For example, as shown in FIG. 11, a case in which a light intensity profile H is obtained when the distance between the fiber array and the substrate plane of the alignment optical circuit is H and a case in which a light intensity profile H2 is obtained when the distance between the fiber array and the substrate plane of the alignment optical circuit is H2 are taken into consideration. In the intensity profiles, a horizontal axis shows the optical sensors 203a to 203h, and the shift amount ΔY between the intensity profile H and the intensity profile H2 is the interval between two adjacent optical sensors. For example, when the arrangement interval between the optical sensors 203a to 203h is 2 μm, ΔY is equal to 2 μm. Further, the relationship between θ2 and ΔY2 obtained when H2-H is equal to 100 μm is shown in FIG. 12. In this case, θ2 becomes approximately 1 degree when ΔY is equal to 2 m.

After the angle θ2 formed by the plane of the substrate 100 and the arrangement direction of the plurality of optical fibers in the fiber array about the X-axis is found as described above, the arrangement direction of the plurality of optical fibers of the fiber array is rotated by the angle found in the third step within the plane parallel to the substrate plane of the alignment optical circuit to perform alignment in a fourth step S114 (rotation). Further, the fiber array that has been subjected to the alignment by the adjustment of the angle about the X-axis is caused to move parallel on the plane of the substrate 100 in a state in which the adjusted angle is maintained, and arranged at the position of optical connection with the plurality of grating couplers 101a to 101j.

Meanwhile, the second embodiment describes a case in which the eight optical sensors 203a to 203h are used as an example, but two or more optical sensors are only required to be used. Further, there is an advantage that the use of more optical sensors makes it possible to find ΔY2 even in a case in which ΔY2 is greater than the arrangement interval between the optical sensors.

As described above, a plurality of optical sensors that are arranged along the arrangement direction of a plurality of grating couplers are provided on a substrate on which the plurality of grating couplers are formed according to the second embodiment. Therefore, alignment for obtaining the optical connection between a plurality of optical fibers of a fiber array in which the plurality of optical fibers are bundled together and corresponding grating couplers can be easily performed.

As described above, a plurality of light-receiving spots are provided on a substrate on which a plurality of grating couplers are formed according to embodiments of the present invention. Therefore, alignment for obtaining the optical connection between a plurality of optical fibers of a fiber array in which the plurality of optical fibers are bundled together and corresponding grating couplers can be easily performed.

Note that it becomes obvious that the present invention is not limited to the embodiments described above and many modifications and combinations could be performed by persons with ordinary knowledge in the field concerned within the technical spirit of the present invention.

REFERENCE SIGNS LIST

100 Substrate
100a Substrate
101a to 101j Grating coupler
102a to 102j Optical waveguide
103 Optical sensor
103a First optical sensor
103b Second optical sensor
104 Fiber array
104a First optical fiber
104j Second optical fiber
131 First light-receiving spot
132 Second light-receiving spot
203a to 203h Optical sensor.

The invention claimed is:
1. An alignment optical circuit comprising:
   a plurality of grating couplers on a substrate and arranged on a line;
   a plurality of optical waveguides connected to the plurality of grating couplers; and
   an optical sensor on the substrate and configured to measure optical intensity at two light-receiving spots on a line along an arrangement direction of the plurality of grating couplers, wherein an interval between the two light-receiving spots is an interval between two of the plurality of grating couplers; and wherein the optical sensor is configured to directly receive light that is emitted from a fiber array passing over the optical sensor.

2. The alignment optical circuit according to claim 1, wherein:

the optical sensor includes a light-receiving region that extends continuously along the arrangement direction from a first light receiving spot of the two light-receiving spots to a second light receiving spot of the two light-receiving spots.

3. The alignment optical circuit according to claim 1, wherein the optical sensor comprises a sensor at each of the two light-receiving spots.

4. The alignment optical circuit according to claim 1, wherein the interval between the two light-receiving spots is an interval between respective ends of the plurality of grating couplers.

5. The alignment optical circuit according to claim 1, wherein the optical sensor is configured to receive the light that is emitted from the fiber array passing over the optical sensor without being optically connected to the plurality of grating couplers and the plurality of optical waveguides.

6. An alignment optical circuit comprising:

a plurality of grating couplers on a substrate and arranged on a line;

a plurality of optical waveguides connected to the plurality of grating couplers; and a plurality of optical sensors on the substrate and arranged along an arrangement direction of the plurality of grating couplers, wherein the plurality of optical sensors are configured to directly receive light that is emitted from a fiber array passing over the plurality of optical sensors.

7. The alignment optical circuit according to claim 6, wherein the plurality of optical sensors is configured to measure optical intensity at two light-receiving spots on a line along an arrangement direction of the plurality of grating couplers, wherein an interval between the two light-receiving spots is the same as an interval between two of the plurality of grating couplers.

8. The alignment optical circuit according to claim 7, wherein the plurality of optical sensors includes a light-receiving region that extends along the arrangement direction and corresponds to the two light-receiving spots.

9. The alignment optical circuit according to claim 7, wherein the plurality of optical sensors comprises a sensor at each of the two light-receiving spots.

10. The alignment optical circuit according to claim 6, wherein the optical sensor is configured to receive the light that is emitted from the fiber array passing over the optical sensor without being optically connected to the plurality of grating couplers and the plurality of optical waveguides.

11. An alignment method for aligning a first grating coupler and a second grating coupler with a first optical fiber and a second optical fiber, respectively, using an alignment optical circuit including a plurality of grating couplers on a substrate and arranged on a line, a plurality of optical waveguides connected to the plurality of grating couplers, and an optical sensor on the substrate and configured to measure optical intensity at two light-receiving spots on a line along an arrangement direction of the plurality of grating couplers, wherein the first grating coupler and the second grating coupler are comprised by the plurality of grating couplers, and the first optical fiber and the second optical fiber are comprised by a fiber array comprising a plurality of optical fibers arranged in a line, the alignment method comprising:

a first step of arranging the fiber array with a light-emitting direction of each of the plurality of optical fibers directed to a side of the alignment optical circuit;

a second step of causing the fiber array to move in a direction perpendicular to the arrangement direction of the grating couplers and pass over the optical sensor within a plane parallel to a plane of the alignment optical circuit in a state in which light is emitted from the first optical fiber and the second optical fiber to the side of the alignment optical circuit and measuring an intensity change of each of first light emitted from the first optical fiber and second light emitted from the second optical fiber at the two light-receiving spots;

a third step of finding an angle formed by the arrangement direction of the plurality of grating couplers and an arrangement direction of the plurality of optical fibers within the plane parallel to the plane of the alignment optical circuit from a difference between the intensity change of the first light and the intensity change of the second light that are measured by the optical sensor; and a fourth step of rotating the arrangement direction of the plurality of optical fibers by the angle found in the third step within the plane parallel to the plane of the alignment optical circuit to perform alignment.

12. The alignment method according to claim 11, wherein the optical sensor includes a light-receiving region that extends along the arrangement direction and corresponds to the two light-receiving spots.

13. The alignment method according to claim 11, wherein the optical sensor comprises a sensor at each of the two light-receiving spots.

* * * * *